June 1, 1965     M. E. HOLMGREN     3,186,438
HOSE STRUCTURE
Filed Oct. 13, 1961
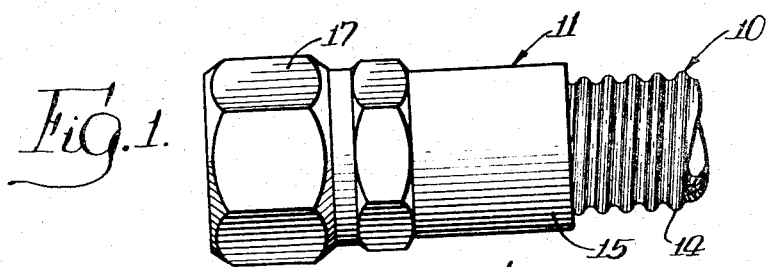
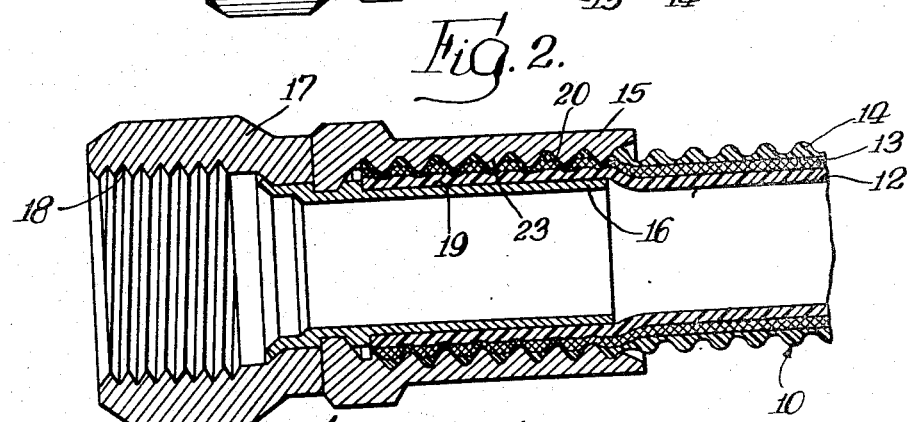
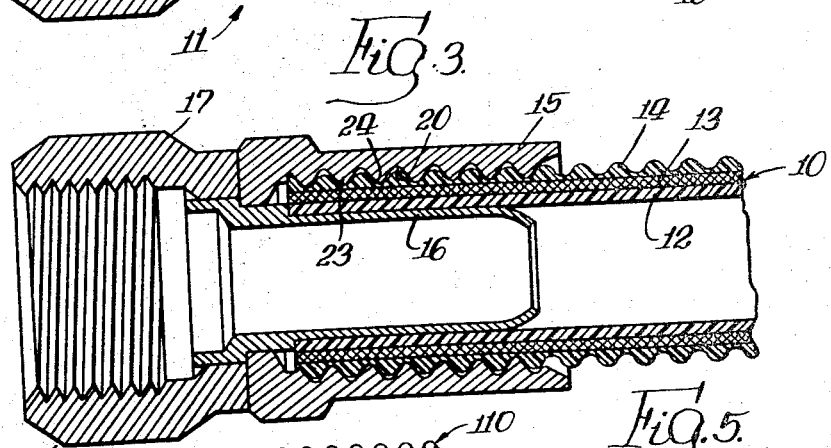
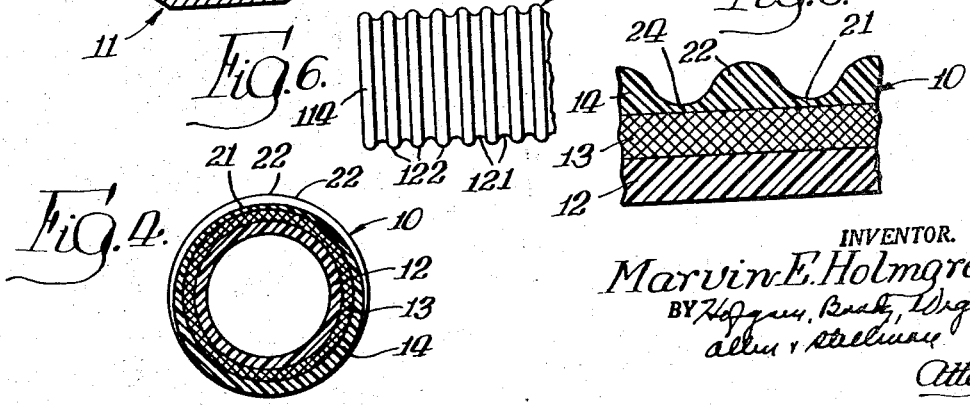
INVENTOR.
Marvin E. Holmgren United States Patent Office  3,186,438
Patented June 1, 1965

3,186,438
HOSE STRUCTURE
Marvin E. Holmgren, Prospect Heights, Ill., assignor to Imperial-Eastman Corporation, a corporation of Illinois
Filed Oct. 13, 1961, Ser. No. 145,022
8 Claims. (Cl. 138—121)

This invention relates to hose and in particular to reinforced plastic hose.

A conventional form of reinforced plastic hose comprises a multi-layer hose having a plastic tubular core, a plastic reinforcing braid overlying the core, and a plastic sheath overlying the braid. A serious problem, however, inherent in such hose construction is the difficulty of maintaining such a hose construction flexible while yet having high kink resistance and resistance to abrasion as well as permitting the use of such hose at high temperatures. The combined requirement of high flexibility and high abrasion resistance is a particularly difficult problem to solve as the requirement of high flexibility dictates the use of a relatively soft sheath material whereas the requirement of high resistance to abrasion dictates the use of a relatively hard sheath material. In one known hose construction of this type, the outer sheath has been made of a urethane plastic which provides a substantial degree of flexibility. However, such a plastic sheath has the tendency to soften at elevated temperatures and, thus, permit the hose to blow out of fittings and the like installed thereon. Another attempt at solving the problem has been to reduce the thickness of the outer sheath. While this does provide a substantially more flexible hose, it undesirably seriously reduces the abrasion life of the hose and this solution too has not been found to be completely satisfactory.

Another problem which arises in the conventional reinforced plastic hose having a relatively thick sheath is the difficulty of obtaining a good grip of fitting elements on the braid portion of the hose. The braid portion of such reinforced plastic hose is the main longitudinal force resisting portion of the hose and it is highly desirable that the fitting elements obtain a good gripping coaction therewith. Where the sheath is relatively thick, the fitting element does not fully penetrate the sheath and, thus, is effectively precluded from having a positive gripping engagement with the reinforcing braid.

The present invention comprehends a new and improved reinforced plastic hose construction which avoids each of the above discussed problems in a novel and simple manner.

Thus, a principal object of the present invention is the provision of a new and improved reinforced plastic hose construction.

Another object of the invention is the provision of such a hose construction wherein the outer sheath is arranged in a novel manner to provide concurrently substantial flexibility and high abrasion resistance and long abrasion life.

Still another object of the invention is to provide such a hose construction wherein the sheath is further arranged to provide improved radial strength.

A further object of the invention is to provide such a hose construction wherein the sheath is provided with a thin inner web portion and a rib projecting radially outwardly from the web portion and extending lengthwise transversely to the axis of the hose.

Still another object of the invention is to provide such a hose construction wherein the web portion is relatively thin and the rib of the sheath has a substantial radial dimension.

A yet further object of the invention is to provide such a hose construction wherein the rib extends helically.

Yet another object of the invention is to provide such a hose construction wherein the pitch of the helical rib is substantially greater than the thickness of the sheath.

Another object of the invention is the provision of such a hose construction wherein the sheath is provided with a plurality of annular axially spaced ribs.

Still another object of the invention is the provision of such a hose construction wherein the outer sheath is formed of a hard, abrasion resistant plastic material and comprises a thin inner web portion and a rib projecting substantially radially outwardly from the web portion, the thin web portion providing high flexibility and the rib providing high abrasion resistance and long abrasion life.

A further object of the invention is to provide such a hose construction wherein the sheath is provided with thin portions corresponding to the inwardly projecting portions of a conventional fitting for facilitated penetration of the sheath by the inwardly projecting portions to grip positively the braid of the hose thereby providing an improved positive retention of the hose in the fitting.

Other features and advantages of the invention will be apparent from the following description taken in connection with the accompanying drawing wherein:

FIG. 1 is an elevation of an end portion of a hose embodying the invention, to which is connected a conventional plastic hose coupling;

FIG. 2 is an enlarged diametric section thereof;

FIG. 3 is an enlarged diametric section similar to that of FIG. 2 but prior to the making up of the coupling;

FIG. 4 is a transverse section of the hose;

FIG. 5 is an enlarged fragmentary diametric section of the hose; and

FIG. 6 is an elevation of an end portion of a modified form of hose embodying the invention.

In the exemplary embodiment of the invention as disclosed in FIGS. 1–5 of the drawing, a hose generally designated 10 is shown to comprise a reinforced plastic hose adapted for use with a conventional coupling 11. Hose 10 includes a tubular inner core 12, an intermediate braid layer 13, and an outer tubular sheath 14. As shown in FIG. 2, the fitting 11 includes a tubular shell 15 and an insert 16 between which the hose end is clamped. As shown in FIG. 2, the shell and insert are retained in association by a body member 17 which is provided with a suitable threaded bore 18 coaxially aligned with the insert 16 to provide a through flow passage from the hose 10. As shown, the insert is provided with a cylindrical radially outer surface 19 and the shell is provided with a helically threaded inner surface 20 between which the hose end is clamped.

Referring now more specifically to FIGS. 4 and 5, the core 12 of hose 10 comprises a relatively thick tubular plastic element which may be formed of a suitable plastic such as nylon. The braid layer 13 is similarly relatively thick and may be formed of a suitable reinforcing braid material such as nylon, or a polyester resin, one example thereof being Dacron (a synthetic fiber made by the condensation of dimethyl terephthalate and ethylene glycol). The sheath 14 has a maximum radial thickness approximately equal to that of the core 12 and braid 13 which is defined by the cumulative thickness of a relatively thin radially inner web portion 21 and a relatively thick abrasion resisting portion herein a rib 22. The abrasion resisting rib projects substantially radially outwardly from the web 21 and extends lengthwise generally transversely to the axis of the hose. More specifically, the rib herein comprises a helical rib having a longitudinal thickness at its mid-portion generally equal to the spacing between the turns thereof. In the illustrated embodiment, the web portion has a radial thickness approximately .01 inch or smaller and the rib has a radial dimension of at least approximately .04 inch. Thus, the rib has a radial dimension at least approximately four times the radial thickness of the web portion thereby providing substantial abrasion resistant life while yet the relatively thin web portion provides a high degree of flexibility in the hose construction. As the relatively thin web portion provides high flexibility notwithstanding the use of a hard sheath material, the sheath may be formed of relatively hard abrasion resistant material such as nylon. The transaxial extension of the rib permits flexing of the sheath between turns thereof while yet the encircling nature of the rib provides a high resistance to radially outward acting forces, thereby providing a high kink resistance in the hose construction.

Another highly desirable feature of the hose construction 10 is the arrangement of the helical rib 22 in accurate complementary conformity to the helical groove 20 of the conventional fitting 11. Thus, when the hose 10 is inserted into the shell 15 as shown in FIG. 3, the helical rib substantially fills the helical groove prior to the expansion of the insert 16. Upon such expansion of the insert to the arrangement of FIG. 2, the rib is intimately forced into the groove 20, assuring a positive high pressure seal and a positive gripping of the sheath over the entire length thereof in the shell effectively precluding undesirable blow out of the hose from the fitting notwithstanding the presence of high temperatures and pressures.

As further shown in FIGS. 2 and 3, the tip portion 23 of the thread defined by the shell groove 20 is preferably somewhat sharper than the arcuate configuration of the valley 24 between the rib turns 22 of the hose. Thus, the tip 23 tends to penetrate through the web portion 21 during the make-up of the fitting so as to engage the braid layer 13 positively upon completion of the make-up of the fitting as shown in FIG. 2. In the illustrated embodiment of FIGS. 1–5, the valley 24 may have a radius of approximately .03 to .035 inch whereas the fitting tip may have a radius of approximately .01 inch. By providing the helical rib 22 with the valleys 24 between turns thereof, the tip 23 of the shell thread does not have to penetrate through the maximum thickness of the sheath as would be the case where the sheath were of uniform thickness throughout. In such sheath structures, it has been found that it is at the best very difficult to effect a full penetration of the sheath in order to obtain the desired gripping engagement of the tooth with the hose braid.

Referring now to FIG. 6, a modified form of hose generally designated 110, embodying the invention, is shown to comprise a hose generally similar to hose 10 except that in lieu of the helical rib 22, the sheath 114 of the hose is provided with a plurality of annular axially spaced ribs 122. The ratio of the radial thickness of the ribs 122 to the thickness of the web portion 121 of the sheath 114 is generally similar to that of the ribs 22 and the web portion 21 of sheath 14. Thus, the ribs 122 provide the same desirable features of high abrasion resistance and long abrasion life as does the rib 14, and the web portion 121 of sheath 114 provides a similar high degree of flexibility in the hose 110.

While the invention has been disclosed as utilizing nylon and Dacron plastic materials, it is to be understood that other suitable core, braid, and sheath materials may be employed. Illustratively, the sheath may be formed of rubber.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A reinforced plastic hose comprising: a tubular core; and a monolithic tubular outer sheath coaxially surrounding said core and formed of a plastic material, said sheath having an internal cylindrical surface of substantially constant diameter throughout and varying in thickness longitudinally to define an alternate succession of innermost flexible thin portions and thick rigid portions projecting radially outwardly of said thin portions, said thick portions extending lengthwise circumferentially about the axis of the hose.

2. The hose of claim 1 wherein said thick portions have a thickness at least approximately four times the radial thickness of the thin portions.

3. The hose of claim 1 wherein said thick portions extend helically.

4. The hose of claim 1 wherein said thick portions extend helically with a pitch substantially greater than the maximum radial thickness of the sheath.

5. The hose of claim 1 wherein said thick portions extend annularly in a plane perpendicular to the axis of the hose.

6. A reinforced plastic hose comprising: a tubular core; a reinforcing braid layer coaxially surrounding said core; and a monolithic tubular outer sheath coaxially surrounding said braid layer and formed of a hard, abrasion resistant plastic material, said sheath having an internal cylindrical surface of substantially constant diameter throughout and varying in thickness longitudinally to define an alternate succession of innermost flexible thin portions and thick rigid portions projecting radially outwardly of said thin portions, said thick portions extending length wise circumferentially about the axis of the hose, said thick portions having a radial dimension at least approximately four times the radial thickness of the thin portions, and the thick portions extending helically with a pitch substantially greater than the maximum radial thickness of the sheath, said thin portions having a radial thickness no greater than approximately .01 inch.

7. The hose of claim 6 wherein said sheath is formed of abrasion resistant nylon.

8. A reinforced plastic hose comprising: a tubular core formed of a plastic material; a reinforcing braid layer coaxially surrounding said core and formed of a plastic material; and a monolithic tubular outer sheath coaxially surrounding said braid layer and formed of a plastic material, said sheath having an internal cylindrical surface of substantially constant diameter throughout and varying in thickness longitudinally to define an alternate succession of innermost flexible thin portions and thick rigid portions projecting radially outwardly of said thin portions, said thick portions extending lengthwise circumferentially about the axis of the hose.

References Cited by the Examiner

UNITED STATES PATENTS

| 2,073,335 | 3/37 | Connell | 138—122 |
|---|---|---|---|
| 2,211,147 | 8/40 | Miller | 138—125 X |
| 2,540,113 | 2/51 | Hartley et al. | 285—259 X |
| 2,570,259 | 10/51 | McKinley. | |
| 2,988,130 | 6/61 | Rittenhouse. | |
| 3,028,289 | 4/62 | Roberts et al. | 138—121 X |
| 3,047,026 | 7/62 | Kahn | 138—122 |
| 3,050,087 | 8/62 | Caplan | 138—121 |

FOREIGN PATENTS

| 231,085 | 3/60 | Australia. |
|---|---|---|
| 286,413 | 3/28 | Great Britain. |
| 413,399 | 7/34 | Great Britain. |
| 1,224,248 | 2/60 | France. |

EDWARD V. BENHAM, *Primary Examiner.*

LEWIS J. LENNY, *Examiner.*